(12) United States Patent
Sahgal et al.

(10) Patent No.: US 11,334,241 B2
(45) Date of Patent: *May 17, 2022

(54) DOCUMENT SHARING WITH ANNOTATIONS

(71) Applicant: Tekion Corp, San Ramon, CA (US)

(72) Inventors: Abhinandan Sahgal, Bengaluru (IN); Justin Alexander Chi-Young Hou, Pleasanton, CA (US); Gaurav Gupta, Chandigarh (IN); Nirmal Sajo Thomas, Thiruvalla (IN)

(73) Assignee: Tekion Corp, Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/233,037

(22) Filed: Apr. 16, 2021

(65) Prior Publication Data

US 2021/0326522 A1 Oct. 21, 2021

Related U.S. Application Data

(63) Continuation of application No. 17/231,370, filed on Apr. 15, 2021.

(Continued)

(51) Int. Cl.
*G06F 17/00* (2019.01)
*G06F 3/04883* (2022.01)
(Continued)

(52) U.S. Cl.
CPC ........ *G06F 3/04883* (2013.01); *B60R 25/102* (2013.01); *B60R 25/24* (2013.01); *B60R 25/305* (2013.01); *G06F 16/176* (2019.01); *G06F 16/9035* (2019.01); *G06F 16/93* (2019.01); *G06F 21/64* (2013.01); *G06F 40/106* (2020.01); *G06F 40/169* (2020.01);
(Continued)

(58) Field of Classification Search
CPC .... G06F 40/197; G06F 40/186; G06F 40/169; G06F 40/106; G06F 3/04883; G06F 16/93; G06F 16/9035; G06F 16/176; G06F 21/64; H04L 65/4015; H04L 65/1069; H04L 67/20; B60R 25/102; B60R 25/24; B60R 25/305; G07C 9/00309; G07C 9/00571; G07C 2009/00373; G07C 2009/00769; G07C 2209/08; G07C 2209/63; H04W 4/022
USPC .......................................................... 715/229
See application file for complete search history.

(56) References Cited

U.S. PATENT DOCUMENTS 9,880,989 B1 * 1/2018 Cadabam .............. G06F 40/169
10,546,047 B1 * 1/2020 Michael ................ G06F 40/106
(Continued)

OTHER PUBLICATIONS

International Search Report and Written Opinion, Patent Cooperation Treaty Application No. PCT/US2021/027528, dated Jul. 14, 2021, 10 pages.

*Primary Examiner* — Jason T Edwards
(74) *Attorney, Agent, or Firm* — Fenwick & West LLP

(57) ABSTRACT

A document management system manages documents. The documents are managed such that the documents may be shared with multiple users during an online sharing session. During the online sharing session of a document, the document may be annotated. The appearance and location of the annotation is consistent across the difference devices of the users even though the devices are of different device types.

17 Claims, 13 Drawing Sheets

Related U.S. Application Data

(60) Provisional application No. 63/010,657, filed on Apr. 15, 2020.

(51) Int. Cl.
| | |
|---|---|
| *H04L 65/1069* | (2022.01) |
| *G07C 9/00* | (2020.01) |
| *H04W 4/021* | (2018.01) |
| *B60R 25/102* | (2013.01) |
| *B60R 25/24* | (2013.01) |
| *B60R 25/30* | (2013.01) |
| *G06F 16/93* | (2019.01) |
| *G06F 21/64* | (2013.01) |
| *H04L 67/53* | (2022.01) |
| *G06F 40/186* | (2020.01) |
| *G06F 40/169* | (2020.01) |
| *G06F 40/197* | (2020.01) |
| *G06F 40/106* | (2020.01) |
| *H04L 65/401* | (2022.01) |
| *G06F 16/9035* | (2019.01) |
| *G06F 16/176* | (2019.01) |

(52) U.S. Cl.
CPC .......... *G06F 40/186* (2020.01); *G06F 40/197* (2020.01); *G07C 9/00309* (2013.01); *G07C 9/00571* (2013.01); *H04L 65/1069* (2013.01); *H04L 65/4015* (2013.01); *H04L 67/20* (2013.01); *H04W 4/022* (2013.01); *G07C 2009/00373* (2013.01); *G07C 2009/00769* (2013.01); *G07C 2209/08* (2013.01); *G07C 2209/63* (2013.01)

(56) References Cited

U.S. PATENT DOCUMENTS

| | | | |
|---|---|---|---|
| 2008/0028323 A1* | 1/2008 | Rosen | G06Q 10/10 715/752 |
| 2009/0019367 A1 | 1/2009 | Cavagnari et al. | |
| 2010/0030578 A1 | 2/2010 | Siddique et al. | |
| 2011/0126127 A1* | 5/2011 | Mariotti | H04M 7/0027 715/753 |
| 2012/0151378 A1* | 6/2012 | Parish | G06F 16/955 715/751 |
| 2012/0173969 A1* | 7/2012 | Schmid | G06F 40/186 715/246 |
| 2014/0129639 A1* | 5/2014 | Burge | H04L 51/32 709/204 |
| 2017/0161246 A1* | 6/2017 | Klima | G06F 40/263 |
| 2017/0286389 A1* | 10/2017 | Ceneviva | G06F 40/186 |
| 2017/0293458 A1 | 10/2017 | Poel et al. | |
| 2018/0129637 A1* | 5/2018 | Lantwin | G06F 40/151 |
| 2018/0145840 A1 | 5/2018 | Advani et al. | |
| 2019/0026258 A1* | 1/2019 | Sood | G06F 16/178 |
| 2019/0272141 A1 | 9/2019 | Poel et al. | |

\* cited by examiner

| Document | | | | SHARE — 305 |
|---|---|---|---|---|
| Required Data | | Data Summary 1<br>Condition 1 | Data Summary 2<br>Condition 2 | Data Summary 3<br>Condition 3 |
| Required Data Field 1 | Data Value | Data Value | Data Value | Data Value |
| Required Data Field 2 | Data Value ⎫ 303 | Data Value | Data Value | Data Value |
| Required Data Field 3 | Data Value ⎭ | Data Value | Data Value | Data Value |
| Supplemental Data 1 | | | | |
| Supplemental Data Field 1 | Data Value | Data Value | Data Value | Data Value |
| Supplemental Data Field 2 | Data Value | Data Value | Data Value | Data Value |
| Supplemental Data Field 3 | Data Value | Data Value | Data Value | Data Value |
| Supplemental Data 2 | | | | |
| Supplemental Data Field 4 | Data Value | Data Value | Data Value | Data Value |
| Supplemental Data Field 5 | Data Value | Data Value | Data Value | Data Value |
| Supplemental Data Field 6 | Data Value | Data Value | Data Value | Data Value |

| Group/Field Name | Hide/Show | Preview 407 | | | |
|---|---|---|---|---|---|
| Required Data | ● | | Data Summary 1 Condition 1 | Data Summary 2 Condition 2 | Data Summary 3 Condition 3 |
| Supplemental Data 1 | ○ | Required Data Field 1 Data Value | Data Value | Data Value | Data Value |
| Supplemental Data 2 | ○ | Required Data Field 2 Data Value | Data Value | Data Value | Data Value |
| Supplemental Data Field 1 | ● | Required Data Field 3 Data Value | Data Value | Data Value | Data Value |
| Supplemental Data Field 2 | ○ | Supplemental Data Field 1 | Data Value | Data Value | Data Value |
| Supplemental Data Field 3 | ○ | | | | SHARE |

DOCUMENT SHARING WITH ANNOTATIONS

CROSS-REFERENCE TO RELATED APPLICATION

This application is a continuation of U.S. patent application Ser. No. 17/231,370 filed on Apr. 15, 2021 which claims priority to U.S. Provisional Application No. 63/010,657 filed on Apr. 15, 2020, each of which is incorporated by reference in its entirety.

BACKGROUND

Field of Disclosure

The present disclosure generally relates to a document management system, and more specifically to sharing documents managed by the document management system during an online sharing session.

Description of the Related Art

In collaborative environments where participants are located in different geographical locations, document sharing tools are used to share documents between the participants. However, conventional document sharing tools merely share an image of the display screen of one of the participants of the collaborative session. Furthermore, during the collaborative session, a participant may annotate the document being shared with other participants in the collaborative session. However, an annotation created by a first participant using a first type of device may appear different on a second type of device of a second participant since conventional document sharing tools are merely sharing an image of the display screen of one of the participants.

SUMMARY

A document management system is configured to manage one or more documents that include content. A document stored in the document management system may be shared with multiple participants during an online sharing session. During the online sharing session, the document itself is shared with the participants of the online sharing session rather than merely an image of a display screen of one of the participants. The shared document may be the document in its entirety or may be a portion of the entire document.

In one embodiment, the document management system may receive an annotation to content included in the shared document. An appearance and location of the annotation added to the shared document during the online session is consistent across the devices of the participants even though different types of devices are used by the participants during the online session.

BRIEF DESCRIPTION OF DRAWINGS

FIG. 3 is an example document according to one embodiment.

FIGS. 4A and 4B illustrate example filters for filtering portions of the document for sharing according to one embodiment.

FIG. 5 is an example of an online sharing session including a shared version of the document, according to one embodiment.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Document Management System Environment

Figure 1:
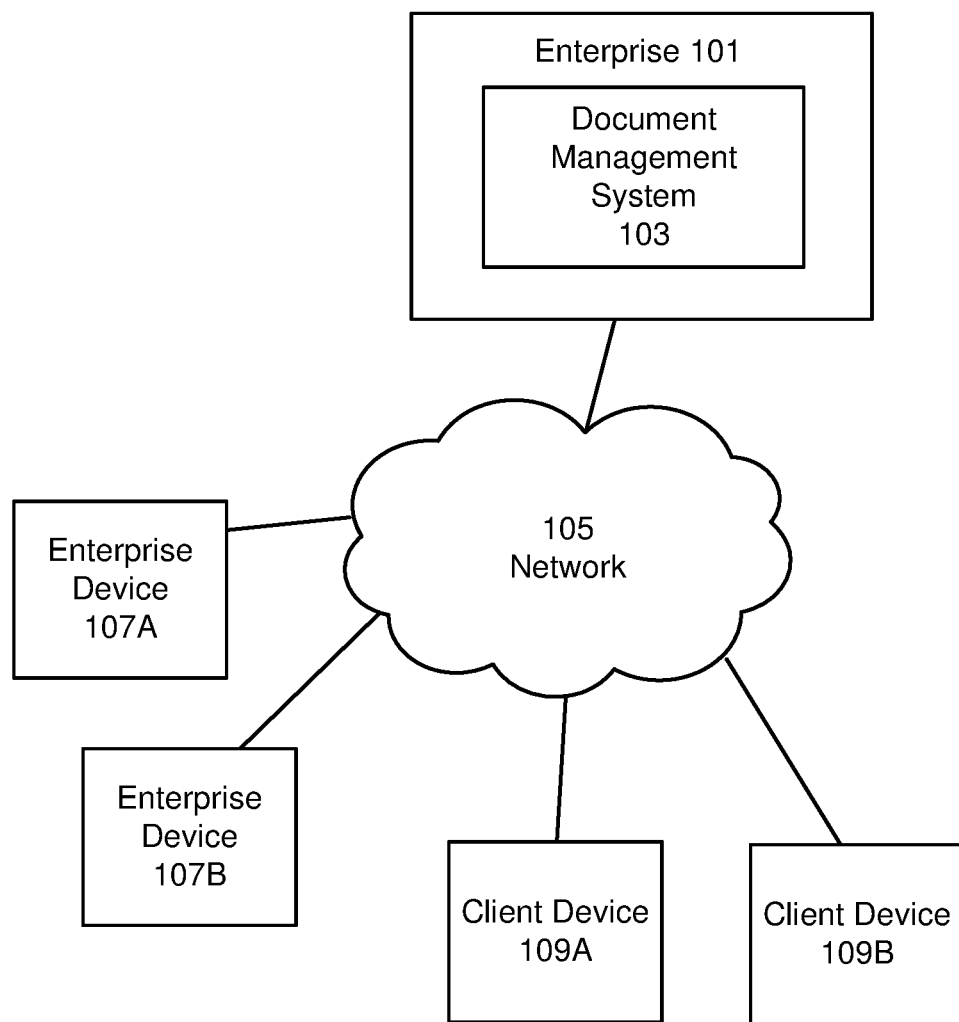
FIG. 1 is a high-level block diagram illustrating an embodiment of an environment for sharing documents according to one embodiment.

FIG. 1 is a high-level block diagram illustrating an embodiment of an environment 100 of a document management system 103 for sharing documents of an enterprise 101. An example of an enterprise 101 included in the environment is an automobile dealership. However, the enterprise 101 can be any type of entity that requires document sharing during online sharing sessions with multiple participants. The documents managed by the document management system 103 may include any type of data related to the enterprise 101 such as a deal sheet.

Figure 9:
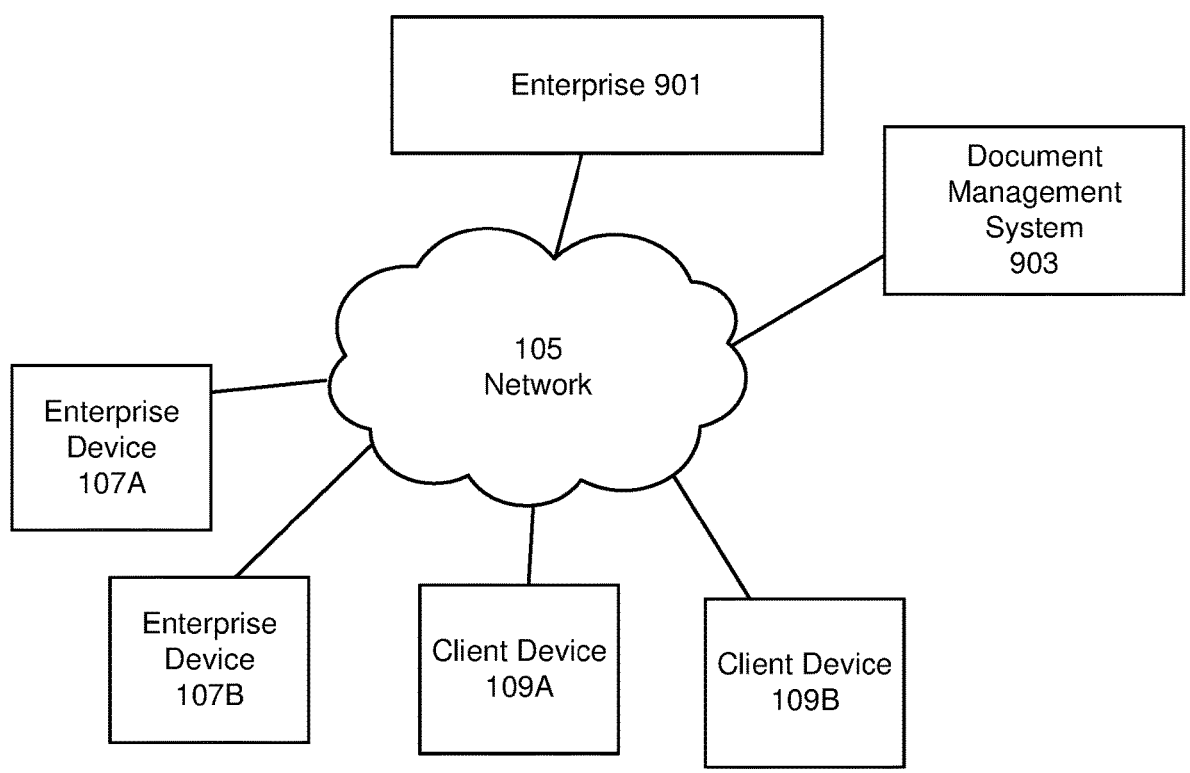
FIG. 9 is a high-level block diagram illustrating another embodiment of an environment for sharing documents according to one embodiment

In one embodiment, the environment 100 includes the enterprise 101, a plurality of enterprise devices 107A to 107B, and a plurality of client devices 109A to 107B connected to each other via a network 105. As shown in FIG. 1, the enterprise 101 includes a document management system 103. Note that in another embodiment such as shown in FIG. 9, the document management system 103 may be separate from the enterprise 101 as will be further described below with respect to FIG. 9. Any number of document management systems, enterprises, and client devices may be present in other embodiments.

The network 105 provides a communication infrastructure between the entities included in environment 100. The network 105 is typically the Internet, but may be any network, including but not limited to a Local Area Network (LAN), a Metropolitan Area Network (MAN), a Wide Area Network (WAN), a mobile wired or wireless network, a private network, or a virtual private network.

Enterprise devices 107 and client devices 109 may include any type of device having an application that communicates with the document management system 103 of the enterprise 101. For example, an enterprise device 107 and/or a client device 109 may be a mobile device or personal computer or any other type of device.

Generally, enterprise devices 107 represent devices of the enterprise 101. Representatives of the enterprise 101 use enterprise devices 107 to access documents stored by the document management system 103. Accessing documents may include generating new documents and sharing the newly generated documents with other representatives of the enterprise 101 and/or with customers of the enterprise 101. Accessing documents may further include viewing existing entries in a document, adding new entries to the documents, modifying existing entries in the documents, and/or delete existing entries in the document.

In contrast, a client device 109 represents devices of non-representatives of the enterprise 101. An example of a non-representative of the enterprise 101 is a customer of the enterprise 101. Although the embodiments herein describe sharing of documents between representatives of the enterprise 101 and non-representatives of the enterprise 101, the embodiments may be applied to any types of entities that require document sharing between people.

In one embodiment, the enterprise device 107 and client device 109 may each include an application that allows interaction with the document management system 103 to share documents stored by the document management system 103. The application may be a dedicated application specifically designed by the organization associated with the document management system 103. The application allows for interaction with the document management system 103.

The document management system 103 is configured to manage one or more documents that store data of the enterprise 101. Enterprise representatives use enterprise devices 107 to generate documents using stored data and share the documents with client devices 109 of non-representatives during online sharing sessions created by the document management system 103. As will be further described below, shared documents may be annotated during online sharing sessions.

Document Management System

Figure 2:
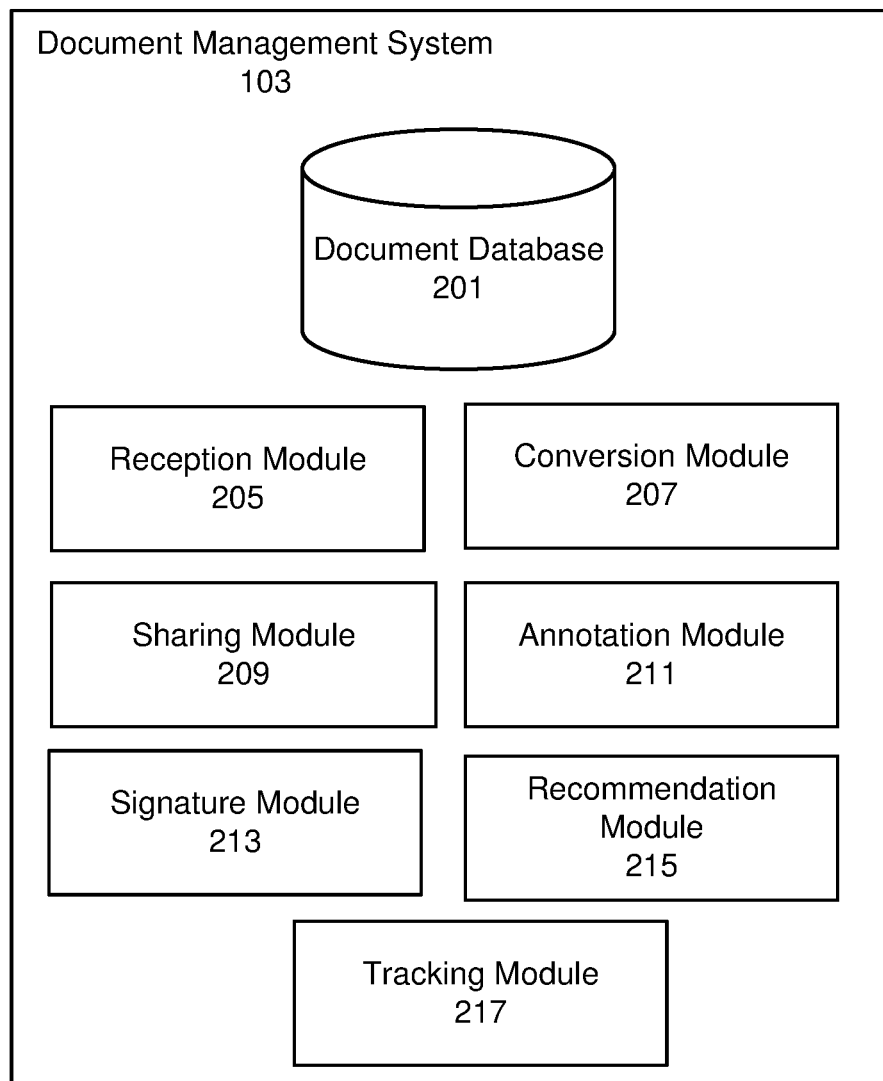
FIG. 2 is a high-level block diagram illustrating a detailed view of a document management system, according to one embodiment.

FIG. 2 is a high-level block diagram illustrating a detailed view of the document management system 103 of FIG. 1. In one embodiment, the document management system 103 includes a document database 201, a reception module 205, a conversion module 207, a sharing module 209, an annotation module 211, a signature module 213, a recommendation module 215, and a tracking module 217. Note that in other embodiments, the document management system 103 may include other modules and/or databases than those illustrated in FIG. 2.

The document database 201 is configured to store one or more documents of the enterprise 101. The documents can be any type of document. For example, the document may be a summary sheet of an automotive deal with a customer of the enterprise 101. However, any type of documents may be stored in the document database 201 for sharing.

In one embodiment, a document includes content such as a plurality of fields and a corresponding value for each field that collectively form the document. The fields of data and their corresponding values may be arranged in a series of rows and columns. However, other organization formats can be used for documents. FIG. 3 is an example document 300 stored in the document database 201 according to one embodiment. As shown in FIG. 3, the document includes a plurality of fields of data 301 and their corresponding values 303 arranged in a series of rows and columns.

The document database 201 may also store one or more document templates used to generate new documents. In one embodiment, each document template is associated with a particular type of document and includes required fields of data for the document template. The values for the fields of data included in each document template are blank.

Referring back to FIG. 2, the reception module 205 receives requests to generate new documents. A request to generate a new document may specify the type of document to be generated. In one embodiment, the reception module 205 receives a request to generate a new document from an enterprise device 107. However, in other embodiment the requests may be received from either the enterprise device or client device 109.

In response to receiving the request, the reception module 205 retrieves a document template associated with the type of document specified in the request from the document database 201 and transmits the retrieved document template to the device of the user that transmitted the request. The reception module 205 determines values for the fields of data included in the document template. In one embodiment, the reception module 205 receives values for one or more fields of data of the document template from the device of the user that requested to generate the document and inserts the values into the document template.

In one embodiment, the reception module 205 automatically inserts values into the document template. One or more fields of data may indicate a location in another document stored in the document management system from which to retrieve the values for the document template. The reception module 205 automatically retrieves the values from another document(s) as indicated in the one or more fields of the document template. The retrieved values are automatically added to the appropriate fields in the document template by the reception module 205.

Once the fields of data included in the document template are completed, the reception module 205 receives a request to store the document as a new document in the document database 201 from the device of the user. In one embodiment, the reception module 205 stores the document in the document database 201 using an editing format (e.g., a file format). In one embodiment, the editing format may not be conducive for sharing with others, but is beneficial for editing purposes. For example, the editing format may be a spreadsheet format for example.

In one embodiment, documents stored in the document database 201 may be shared between devices of multiple users in an online sharing session. By sharing the document during the online sharing session, the amount of time that the participants of the online sharing session need to physically interact in-person with each other is reduced, if not eliminated completely. In one embodiment, the reception module 205 may receive a request from a device of a user to share a document stored in the document database 201. The request may be received in response to a selection of a user interface element included in document for sharing the document. For example, FIG. 3 includes a sharing user interface element 305 that indicates to the document management system 103 a request to share the document 300 responsive to user selection of the sharing user interface element 103.

As mentioned above, the format of documents stored in the document database 201 is not ideal for sharing during an online sharing session. Responsive to the request to share a document, the conversion module 207 converts the document into a format for sharing during an online session. To perform the conversion, the conversion module 207 receives from the user that transmitted the request sharing criteria which is indicative of portions of the document to share during the online sharing session and portions of the document to exclude from sharing during the online sharing session. That is, the user may decide to share the document in its entirety or share a subset of the document during the online session. For example, the user may filter the fields of information of the document that are shown to another user during the online session, so that the other user is only provided with the most relevant information of the document during the online sharing session.

In one embodiment, the conversion module 207 transmits a filtering tool 400 to the device of the user that requested to share the document, as shown in FIG. 4A. The filtering tool 400 includes a list of filtering criteria 401. The filtering criteria specifies portions of the content included in the document to include in the shared document as well as portions of the content included in the document to exclude from the shared document. For example, in FIG. 4A the filter includes a list of names of fields of information (e.g., filtering criteria) included in the document that may be either included or removed (e.g., filtered) from the document for sharing during the online session.

In one embodiment, the document may be filtered based on groups of fields of information or individual fields of information. Groups of fields of information include multiple fields of information in the document whereas an individual field of information includes only a single field of information in the document. One example of a group of fields of information is the "Required Data" group 405 and one example of an individual field of information is the "Supplemental Data Field 1" 407 as shown in the filter 401. Referring back to FIG. 3, the "Required Data" group includes a plurality of fields of information in the group whereas the "Supplemental Data Field 1" is a single information field included under the group "Supplemental Data 1."

Referring back to FIG. 4A, each group of fields of information and individual field of information includes a mechanism 407 for filtering the respective group or individual field of information. The mechanism 407 is used to indicate whether to enable (e.g., show) or disable (e.g., hide) the group or individual field of information that is associated with the mechanism in the document during the online sharing session. Thus, the user may decide which information to include in the shared document during the online sharing.

In one embodiment, the conversion module 207 renders a preview 403 of the document for sharing during the online sharing session. The preview is transmitted to the device of the user and visually indicates the appearance and the content of the document that will be shared during the online sharing session. By providing the user with the preview, the user may decide to edit the fields of information that are included in the document during the online sharing session by enabling or displaying content to include in the shared document.

In one embodiment, the rendered preview includes the selected content of the document using the filtering tool 400 and allows the user to verify the content of the document to be shared during the online session. In one embodiment, the conversion module 207 generates the preview of the document in a preview format (e.g., file format) that is different from the editing format of the document. The preview format is a format that can be used to quickly render the document based on the selected filtering criteria. For example, the preview format may be a markup language format such as HTML. However, other preview formats may be used for generating the preview of the document.

Figure 4B:
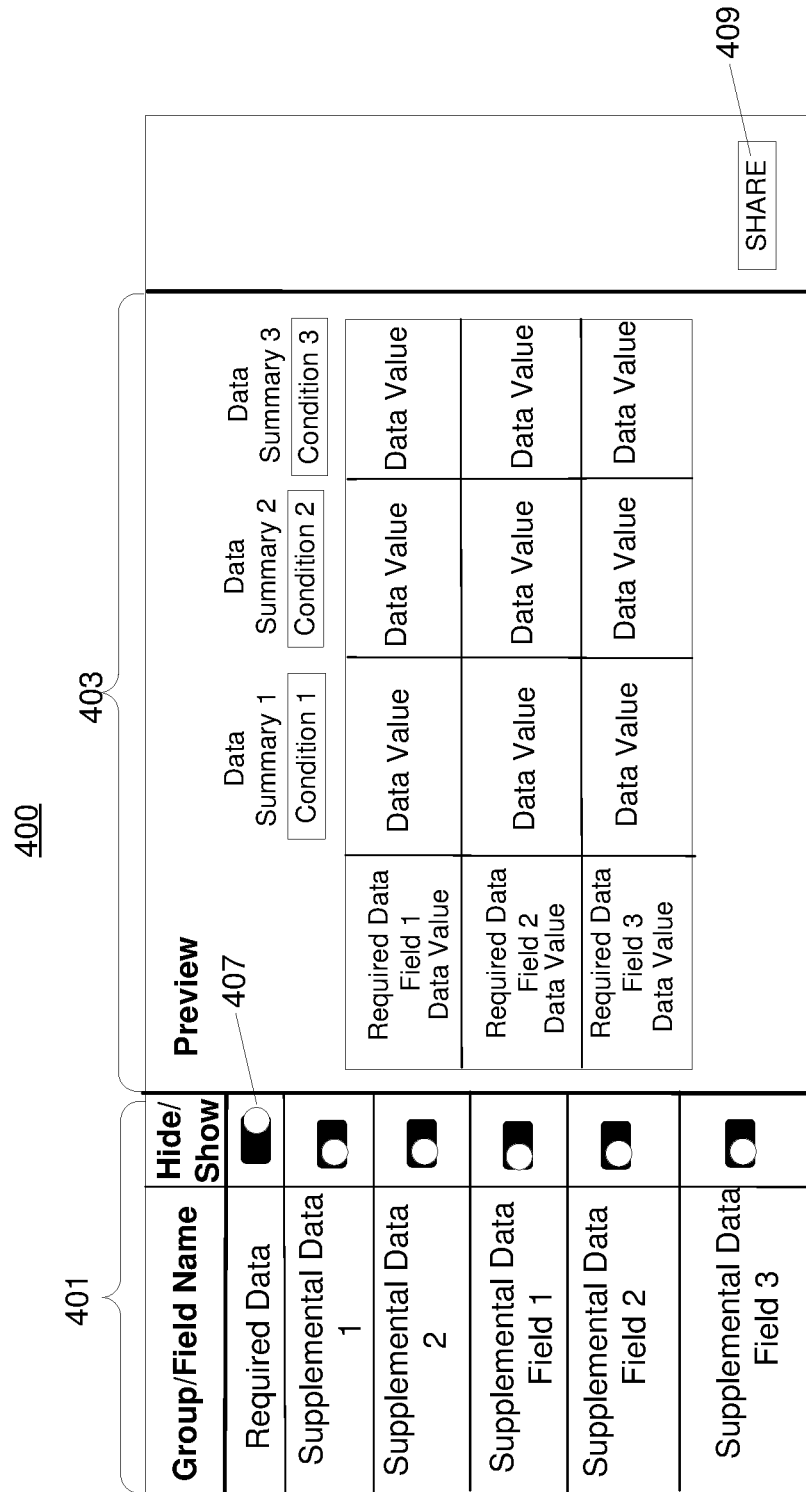

In FIG. 4A, the preview 403 of the document for sharing includes the group of fields of information "Required Data" as well as the individual field of information "Supplemental Data Field 1" as a result of the enabled fields included in the filtering criteria 401. In contrast, in FIG. 4B, the preview 403 of the document for sharing is updated to include only the group of fields of information "Required Data" as the user may decide not to include the individual field of information "Supplemental Data Field 1".

The conversion module 207 may receive a request from the device of the user to share the document shown in the preview with another user during an online sharing session upon approval of the document. The request may be received from the conversion module 207 responsive to the user selecting the "share" user interface element 409 as shown in FIGS. 4A and 4B, for example.

In one embodiment, the request may include a plurality of request attributes. The request attributes include one or more identifiers of one or participants requested to participate in the online sharing session of the document. An identifier of a participant may include an email address of the participant, for example. The request attributes may also include a date and time for the online sharing session.

The conversion module 207 generates the document for sharing during the online sharing session based on the preview. The version of the document for sharing may be stored in the document database 201 for use during the online sharing session. In one embodiment, the conversion module 207 may generate the document for sharing responsive to the sharing request. Alternatively, the conversion module 207 may wait to generate the document for sharing until the date and time of the online sharing session.

To generate the document for sharing, the conversion module 207 may convert the preview of the document that is in the preview format (e.g., HTML) into a sharing format. In one embodiment, the sharing format is a file format that is used to display documents in electronic form independent of the software, hardware, or operating system that is used to display the document. For example, the conversion module 207 may convert the preview of the document into a portable document format (PDF). However, other sharing formats may be used.

In one embodiment, the sharing module 209 shares a stored document that is in the sharing format with multiple participants during a scheduled online session. The sharing module 209 may transmit an invitation for the online sharing session to devices of the participants identified in the request attributes. Only participants who have the link will be authorized access to the online sharing session. The invitation may optionally include authentication information (e.g., a password) required to access the online sharing session. The participants of the online sharing session may include one or more representatives of the enterprise 101 and one or more non-representatives, for example. At the date and time of the online sharing session, the participants select the link using their devices which directs a web browser on the devices of the participants to the online sharing session.

Figure 5:
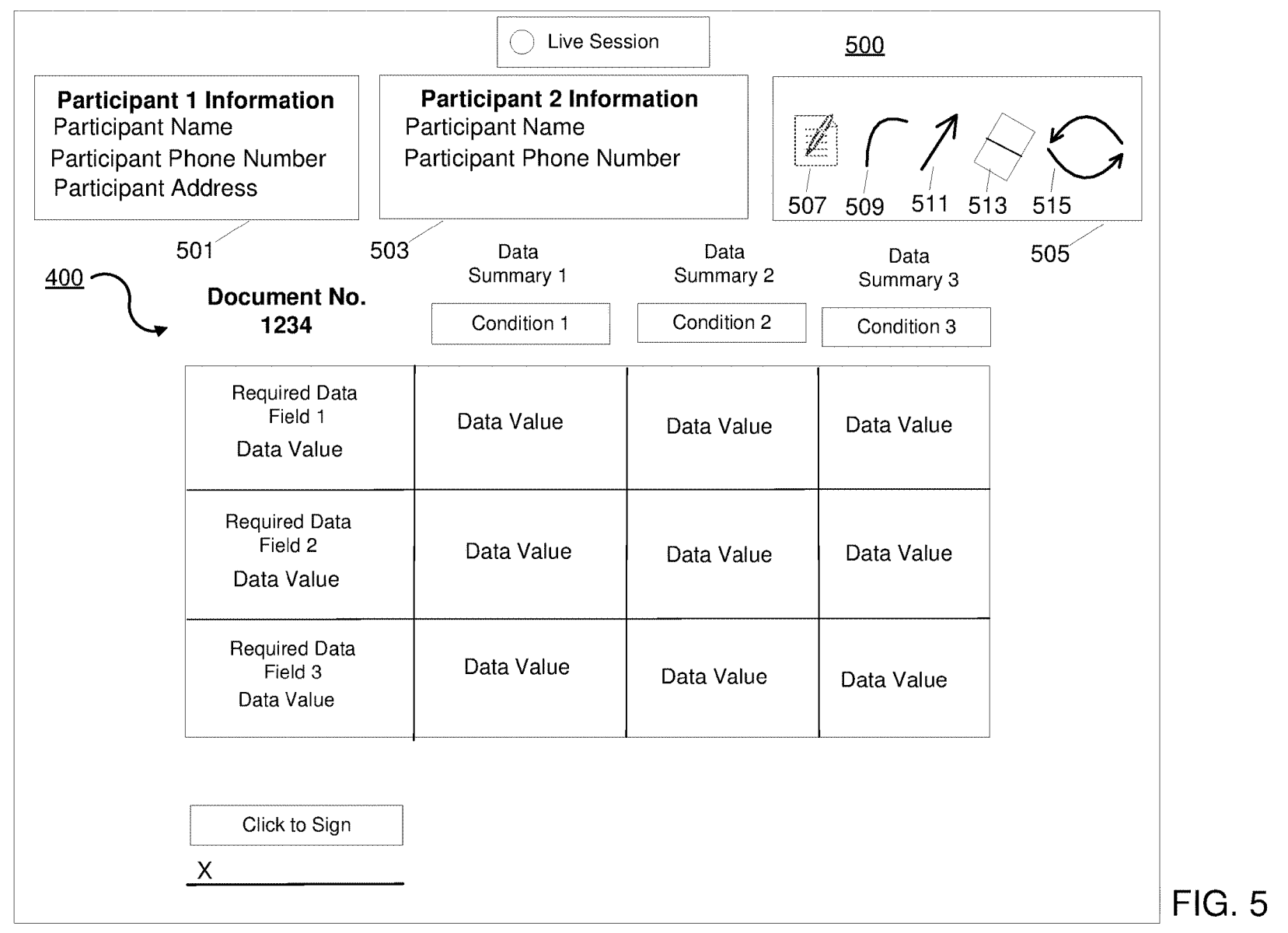

During the online sharing session, the sharing module 209 shares the document stored in the sharing format. That is, the actual document is shared during the online session rather than merely an image of the content displayed on a display screen of one of the participant's device. FIG. 5 illustrates one example of an online sharing session 500. As shown in FIG. 5, the online sharing session include the shared document 400 that is in the sharing format shown in FIG. 4B as well as participant information 501 and 503. The participant information may include attributes of each participant such as their name, phone number, address, etc. However, any other type of information may be included in the participant information.

During the online sharing session, the participants may review the shared document in a collaborative environment. To aid in the explanation of the content of the document, the online sharing session includes a plurality of annotation tools. In one embodiment, the annotation tools may be used to supplement content (e.g., fields of information) in the shared document, but cannot be used to modify the existing content included in the document such as deleting or editing values or the information fields included in the document. In one embodiment, any of the participants of the online sharing session may use the annotation tools to annotate the shared document. In another embodiment, only participants granted permission to annotate the document during the online sharing session are allowed to annotate the document. For example, the participant that authored the document may be the only participant allowed to annotate the document.

In the example shown in FIG. 5, the online sharing session 500 includes annotation tools 505 to annotate the shared document. In one embodiment, the annotation tools include a highlighting tool 507, a drawing tool 509, an arrow tool 511, an eraser tool 513, and an undo tool 515. In other embodiments, the annotation tools may include other tools than shown in FIG. 5.

Figure 6A:
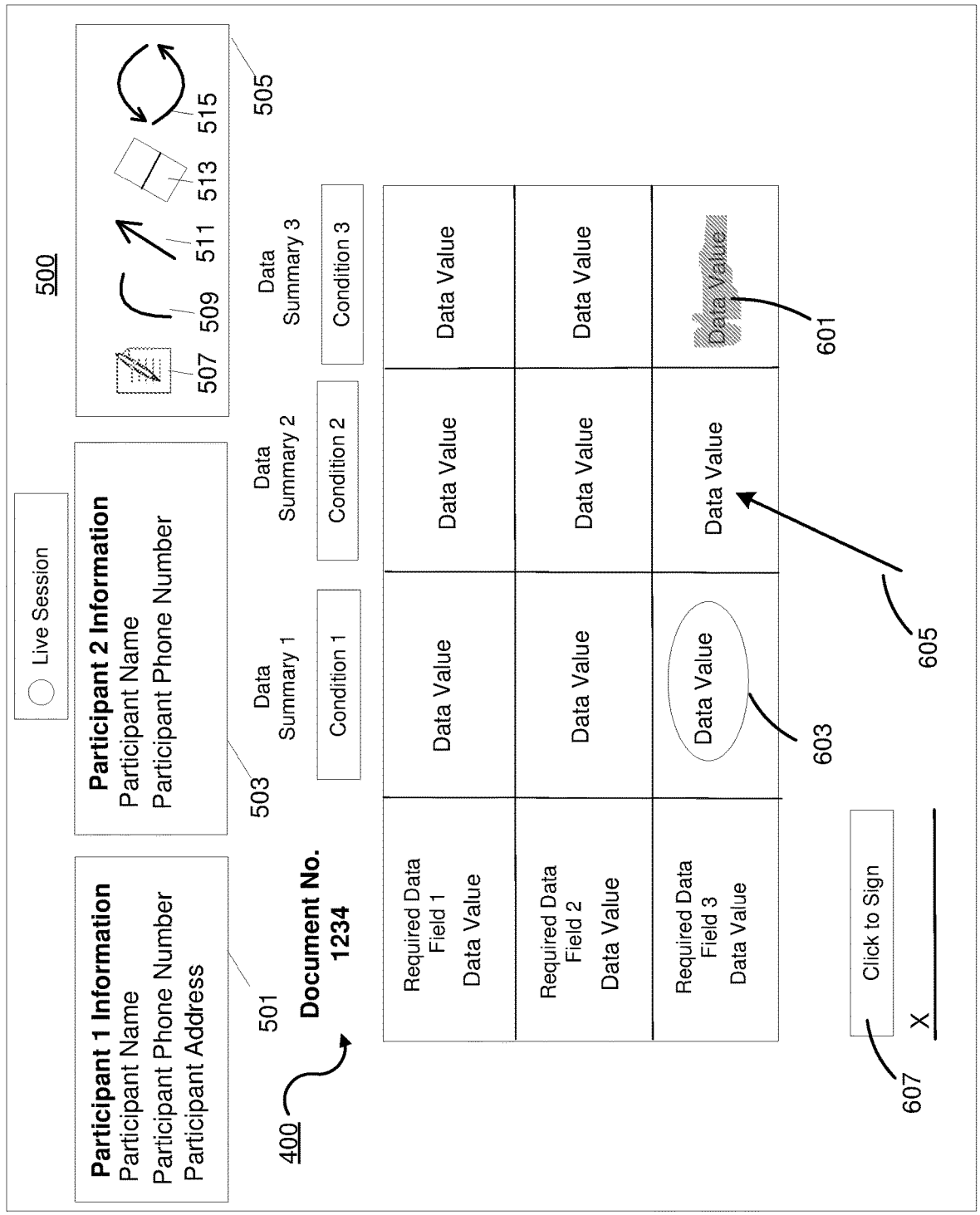
FIG. 6A is an example of annotations to the shared document, according to one embodiment.

In one embodiment, a participant of the online sharing session may use the highlighting tool 507 to highlight content included in the shared document such as a particular field of information of interest. For example, FIG. 6A illustrates a highlight 601 that has been added to a data value included in the shared document. The drawing tool 509 may be used by a participant to draw on the document such as drawing a shape around a particular field of information of interest. For example, in FIG. 6A an oval 603 is drawn around a data value included in the document. The arrow tool 511 may be used by a participant to draw an arrow on the document that points to a particular field of information of interest. For example, in FIG. 6A an arrow 605 is drawn that points a data value included in the document. The eraser tool 513 may be used by a participant to erase any of the annotations added to the document. Lastly, the undo tool 515 may be used by a participant to undo the most recent annotation added to the document.

In one embodiment, an appearance and location of an annotation added to the shared document during the online sharing session is consistent across the devices of the participants regardless of the type of devices used by the participants during the online sharing session. For example, an annotation to the document that is displayed on a desktop computer of a first participant has the same appearance and location in the document displayed on a mobile phone of the second participant. This is due to the document itself being shared during the online sharing session rather than merely an image of the display screen of one of the participants.

In one embodiment, documents in the sharing format have a document grid that is invisible to the participants of the online sharing session. The document grid is a coordinate system that is used to identify the location of annotations added to the document during the online sharing session. In one embodiment, the coordinate system is a Cartesian coordinate system.

An annotation module 211 receives annotations added to the shared document during the online sharing session from devices of participants of the online sharing session. In one embodiment, the received annotation includes annotation attributes. In one embodiment, the annotation attributes include an identifier of the participant that created the annotation, the annotation type (e.g., highlight, arrow, etc.), and one or more coordinates in the document grid that define the location of the annotation in the document. In one embodiment, a new version of the shared document is saved in the document database 201 after each annotation is added to the document. By saving a new version for each added annotation, the document management system 103 is able to undo or redo annotations made to the document.

Figure 6B:
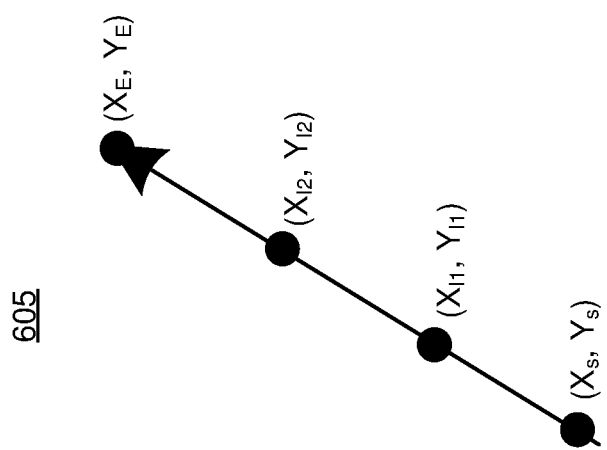
FIG. 6B is an example of coordinates of an annotation, according to one embodiment.

FIG. 6B illustrates an example of points that define the location of the arrow annotation added to the document shown in FIG. 6A. Each point includes a coordinate pair describing the location of the point in a first direction (e.g., X direction) and in a second direction (e.g., Y direction). In one embodiment, the points that define the location of the annotation include a starting point $(X_s, Y_s)$ of the annotation, an ending point $(X_E, Y_E)$ of the annotation, and one or more intermediate points between the starting point and ending point of the annotation $((X_{11}, Y_{11})$ and $(X_{12}, Y_{12}))$ as shown in FIG. 6B.

In one embodiment, the annotation module 211 receives the annotation attributes from the device of the participant that created the annotation and transmits the annotation attributes to devices of the other participants of the online sharing session. Each device renders the annotation on the document displayed on the device according to the annotation attributes. Since the annotation attributes describe the coordinates of the annotation with respect to the document grid of the document, the appearance and location of the annotation is consistent across the devices of the participants regardless of the type of device that is used to participate in the online sharing session.

As mentioned above, the annotation tools may be used to aid in the discussion of the document during the online sharing session. If one of the participants requests to view more information in the shared document as a result of the discussion, the conversion module 207 may receive edited filtering criteria from the device of a participant (e.g., a representative) to generate an edited version of the primary document that includes additional information, and share the edited primary document during the online sharing session. If the existing content (e.g., values of the fields of information) of the shared document requires editing (e.g., addition, deletion, or modification), the reception module 205 may receive edits to values of the document stored in the editing format from the device of the participant (e.g., a representative). The conversion module 207 converts the edited document into the sharing format and the sharing module 209 may re-share the edited primary document during the online sharing session according to the process previously described above.

In one embodiment, a document may require an electronic signature from one or more of the participants of the online sharing session. The electronic signature is a legal way to obtain consent or approval of the shared document from one or more participants of the online sharing session. The signature module 213 may receive a request from a device of a participant of the online sharing session to add an electronic signature to the document.

Figure 7A:
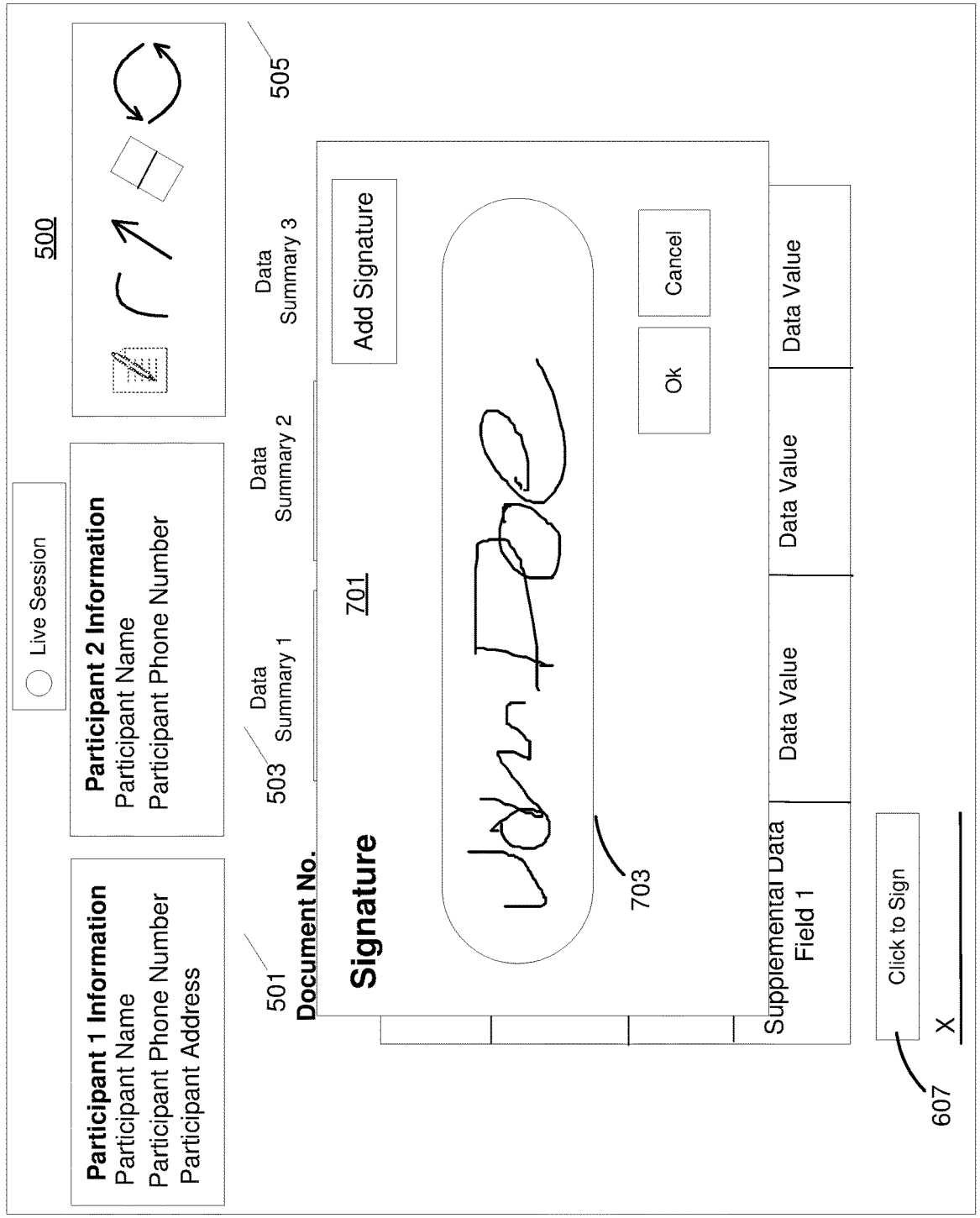
FIGS. 7A and 7B are examples of electronic signatures added to the shared document, according to one embodiment.
Figure 7B:
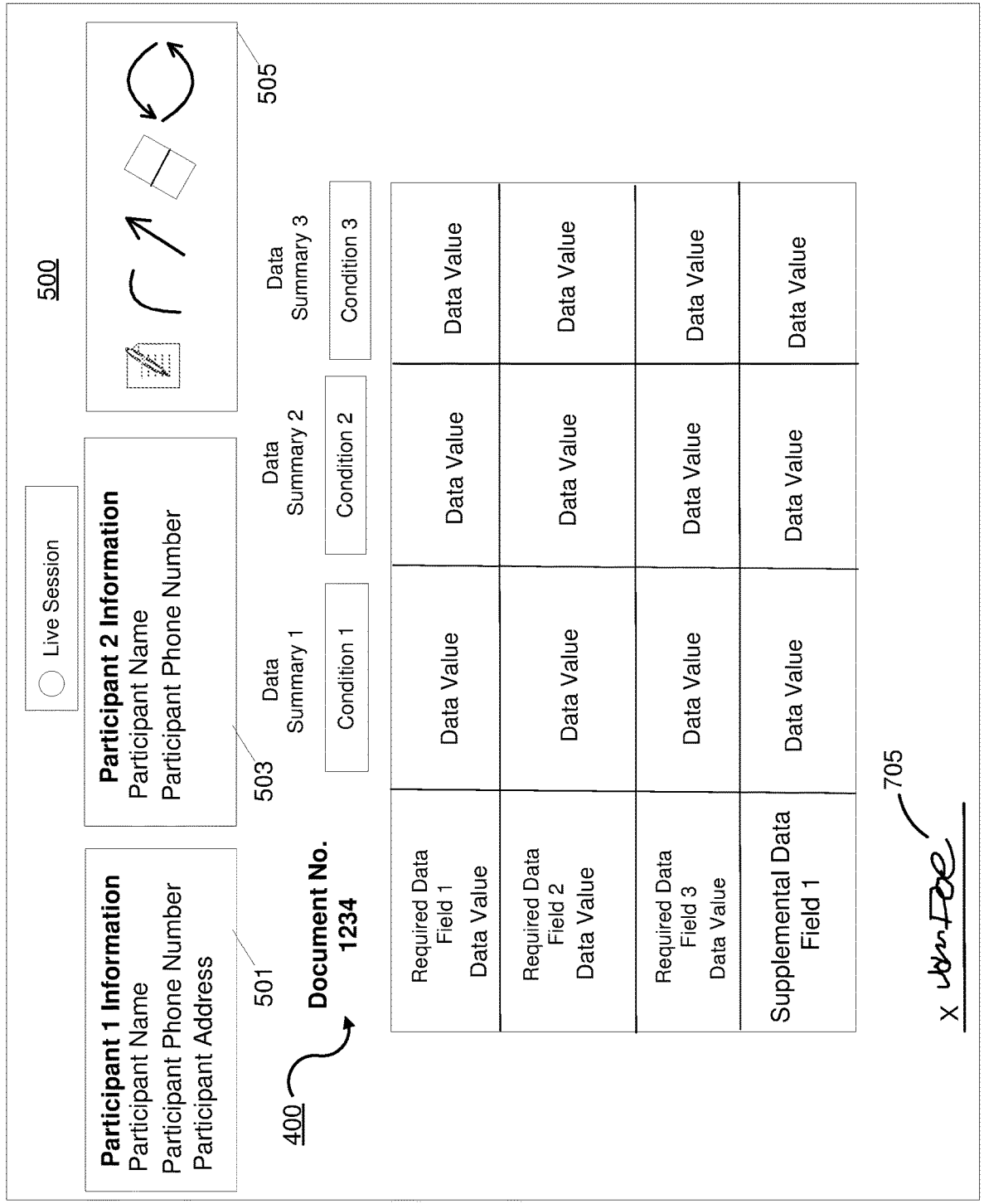

Responsive to the request to add the electronic signature to the document, the signature module 213 transmits an electronic signature tool to the device of the participant that submitted the request. FIG. 7A is one example of the electronic signature tool 701. The electronic signature tool 701 includes a signature location 703 where the participant adds his or her electronic signature. In one embodiment, the signature module 213 receives an electronic signature drawn by the participant in the signature location 703. Alternatively, the signature module 213 transmits different electronic signatures to the participant to select from. The selected signature is added to the document. For example, FIG. 7B illustrates the electronic signature 705 added to the document.

In one embodiment, the recommendation module 215 provides recommendations for a participant (e.g., the non-representative) during the online sharing session. In one embodiment, the document shared during an online sharing session is associated with an article (e.g., a vehicle). The recommendation provided during the online sharing session describes another article (e.g., another vehicle) of the enterprise 101, for example.

In one embodiment, the recommendation module 215 is a machine-learned neural network model. Any machine learning algorithm may be used by the machine-learned neural network models such as linear regression, logistic regression, SVM, etc. The recommendation module 215 is trained to automatically generate recommendations for an online sharing session based on attributes of the online sharing session. The attributes may be participant attributes of a participant of the online sharing session (e.g., the non-representative) as well as document attributes. The document attributes include the values of the fields of information included in the document.

In one embodiment, the tracking module 217 tracks a status associated with the article described in the document. The status may be a location status, for example. The tracking module 217 may transmit notifications to the device of the participant (e.g., the non-representative) that describe the location status of the article. In one embodiment, a tracking device is positioned on a delivery mechanism of the article that periodically transmits geographical location information to the tracking module 217. The tracking module 217 generates the notifications based on the received geographical position information. The notifications may be transmitted to the device of participant automatically or upon request from the device of the participant.

Process for Sharing a Document

Figure 8:
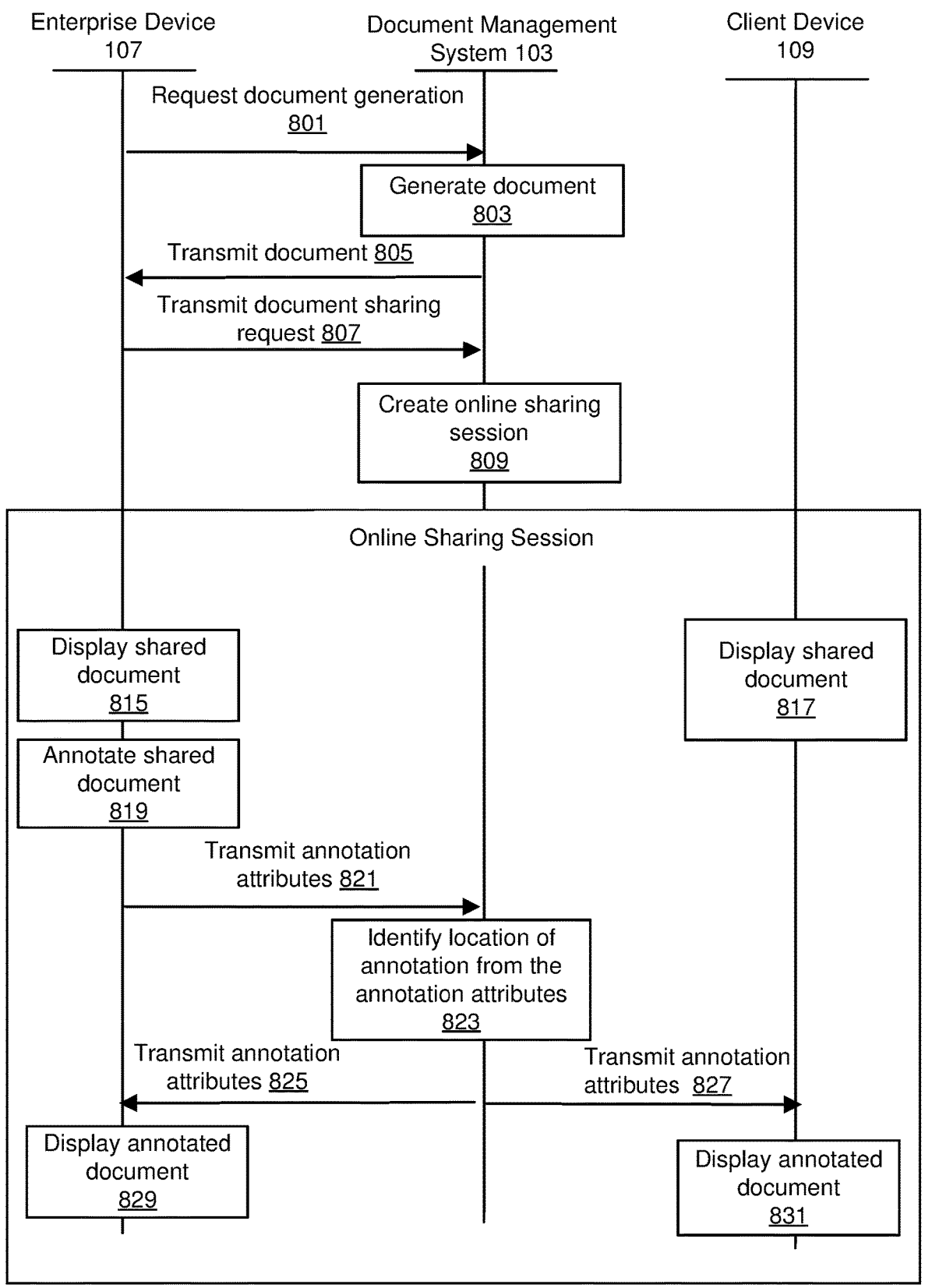
FIG. 8 is an interaction diagram illustrating a process of sharing a document during an online sharing session with multiple participants according to one embodiment.

FIG. 8 is an interaction diagram illustrating a process for sharing a document with multiple participants during an online sharing session. In the example shown in FIG. 8, a document is shared between a representative of the enterprise using enterprise device 107 and a non-representative of the enterprise using client device 109. However, in other embodiments a document may be shared with any type of participant and any number of participants. Furthermore, the process for sharing a document may include other steps than shown in FIG. 8.

The enterprise device 107 transmits 801 a request to generate a document. The request may include a requested document type for generation. The document management system 103 generates 803 the document based on the request. The document management system 103 may generate the document by retrieving a document template. Values for fields of information in the document template may be received from the enterprise device 107 or automatically populated by the document management system 103.

The document management system 103 transmits 805 the document to the enterprise device 107. The enterprise device 107 transmits 807 a document sharing request to the document management system 103. The document sharing request may indicate whether the entire document is shared or portions of the document are shared. The document sharing request may also indicate participants invited to view the shared document during an online sharing session.

The document management system 103 creates 809 an online sharing session that includes the document. During the online sharing session, the enterprise device 107 displays 815 the shared document and the client device 109 also displays 817 the shared document. During the online sharing session, the user of the enterprise device 107 annotates 819 the shared document. The enterprise device 107 transmits 821 the annotation attributes to the document management system 103. The document management system 103 identifies 823 the location of the annotation from the request. In one embodiment, the annotation includes annotation attributes that comprise coordinates of the annotation.

The document management system 103 transmits 825 the annotation attributes to the enterprise device 107 and transmits 827 the annotation attributes to the client device 109. The enterprise device 107 displays 829 the annotated document and the client device 109 displays 831 the annotated document. Since the annotation attributes includes coordinates of the annotation, the enterprise device 107 and the client device 109 are able to render the annotation such that the appearance and position of the annotation in the shared document is consistent across the enterprise device 107 and the client device 109 regardless if the devices are of different device types.

Alternate Document Management System Environment

FIG. 9 is a high-level block diagram illustrating an alternate embodiment of an environment 900 of a document management system for sharing documents of an enterprise 901. The environment 900 is similar to the environment 100 shown in FIG. 1. The environment 900 includes an enterprise 901, a document management system 903, enterprise devices 107 and client devices 109. The entities in environment 900 perform similar functions as their counterparts in environment 100 shown in FIG. 1 thus the description is omitted for readability.

However, in environment 900 the document management system 903 is separated from enterprise 901. In the example of FIG. 9, a separate entity may be responsible for operating the document management system 903 that manages documents on behalf of the enterprise 901. Alternatively, the same entity may be responsible for both the enterprise 901 and the document management system 903, but the document management system 903 is separated from the enterprise 901.

Hardware Components

Figure 10:
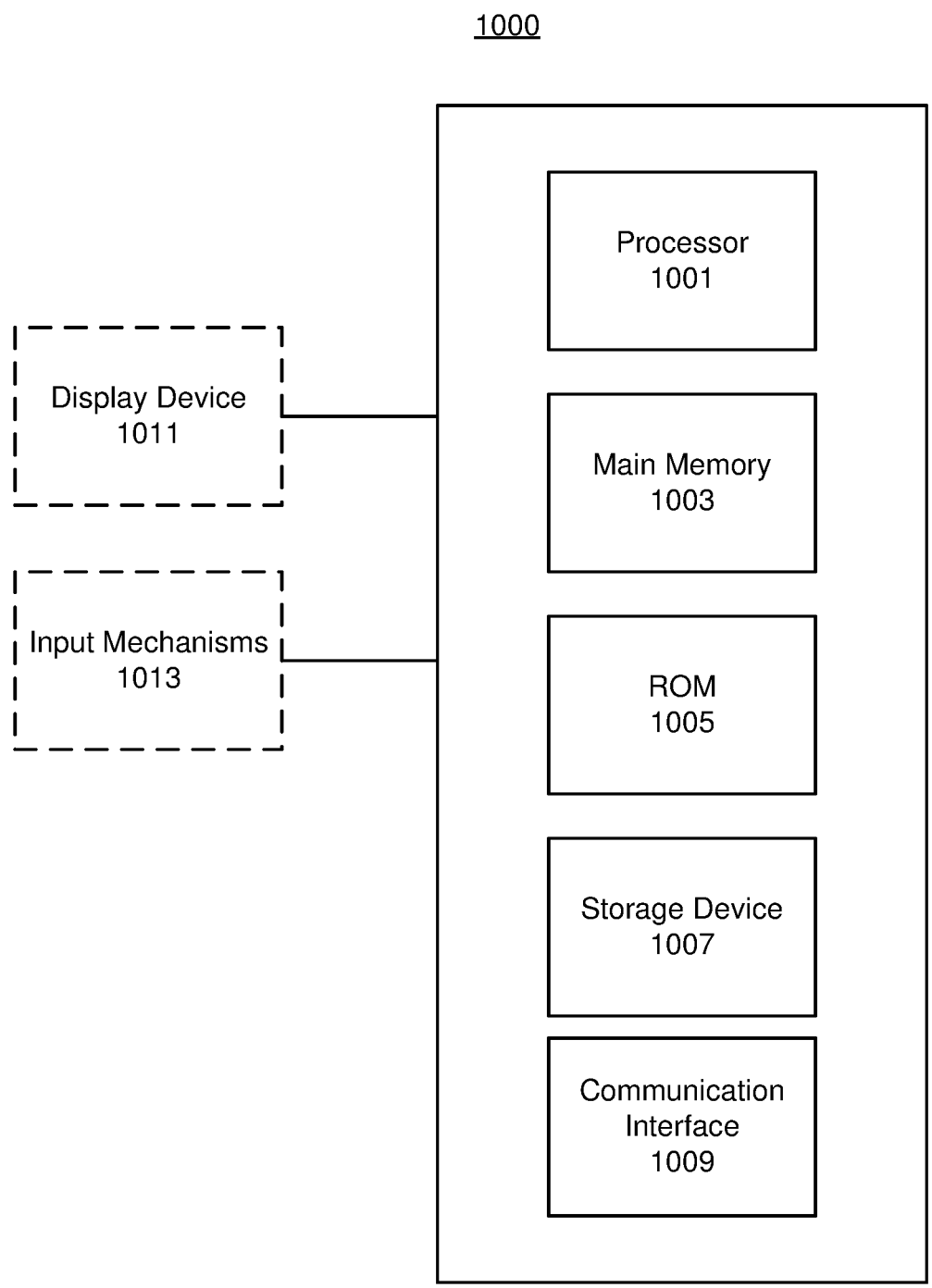
FIG. 10 is system diagram of a computer system, according to one embodiment.

FIG. 10 is a diagram illustrating a computer system 1000 upon which embodiments described herein may be implemented within the document management system 103/903, enterprise devices 107, and client devices 109. For example, the document management system 103/903, enterprise devices 107, and client devices 109 may each be implemented using a computer system such as described by FIG. 10. The document management system 103/903 may also be implemented using a combination of multiple computer systems as described by FIG. 10.

In one implementation, the document management system 103/903, enterprise devices 107, and client devices 109 each include processing resources 1001, main memory 1003, read only memory (ROM) 1005, storage device 1007, and a communication interface 1009. The document management system 103/903, enterprise devices 107, and client devices 109 each include at least one processor 1001 for processing information and a main memory 1003, such as a random access memory (RAM) or other dynamic storage device, for storing information and instructions to be executed by the processor 1001. In one embodiment, multiple processors are employed by the document management system 103/903 to perform the techniques described above in order to improve efficiency of the document management system 103/903 and reduce computation time when sharing documents. Main memory 1003 also may be used for storing temporary variables or other intermediate information during execution of instructions to be executed by processor 1001. The document management system 103/903, enterprise devices 107, and client devices 109 may each also include ROM 1005 or other static storage device for storing static information and instructions for processor 1001. The storage device 1007, such as a magnetic disk or optical disk or solid state memory device, is provided for storing information and instructions.

The communication interface 1009 can enable each of document management system 103/903, enterprise devices 107, and client devices 109 to communicate with each other through use of a communication link (wireless or wireline). Each of document management system 103/903, enterprise devices 107, and client devices 109 can optionally include a display device 1011, such as a cathode ray tube (CRT), an LCD monitor, an LED monitor, OLED monitor, a TFT display or a television set, for example, for displaying graphics and information to a user. An input mechanism 1013, such as a keyboard that includes alphanumeric keys and other keys, can optionally be coupled to the computer system 1000 for communicating information and command selections to processor 1001. Other non-limiting, illustrative examples of input mechanisms 1013 include a mouse, a trackball, touch-sensitive screen, or cursor direction keys for communicating direction information and command selections to processor 1001 and for controlling cursor movement on display device 1011.

Examples described herein are related to the use of the document management system 103/903, enterprise devices 107, and client devices 109 for implementing the techniques described herein. According to one embodiment, those techniques are performed by each of the document management system 103/903, enterprise devices 107, and client devices 109 in response to processor 1001 executing one or more sequences of one or more instructions contained in main memory 1003. Such instructions may be read into main memory 1003 from another machine-readable medium, such as storage device 1007. Execution of the sequences of instructions contained in main memory 1003 causes processor 1001 to perform the process steps described herein. In alternative implementations, hard-wired circuitry may be used in place of or in combination with software instructions to implement examples described herein. Thus, the examples described are not limited to any specific combination of hardware circuitry and software. Furthermore, it has also proven convenient at times, to refer to arrangements of operations as modules, without loss of generality. The described operations and their associated modules may be embodied in software, firmware, hardware, or any combinations thereof.

Reference in the specification to "one embodiment" or to "an embodiment" means that a particular feature, structure, or characteristic is included in at least one embodiment of the disclosure. The appearances of the phrase "in one embodiment" or "a preferred embodiment" in various places in the specification are not necessarily referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects disclosed herein include process steps and instructions described herein in the form of a method. It should be noted that the process steps and instructions described herein can be embodied in software, firmware or hardware, and when embodied in software, can be downloaded to reside on and be operated from different platforms used by a variety of operating systems.

The embodiments discussed above also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the embodiments are not described with reference to any particular programming language. It will be appreciated that a variety of programming languages may be used to implement the teachings described herein, and any references below to specific languages are provided for disclosure of enablement and best mode.

While the disclosure has been particularly shown and described with reference to a preferred embodiment and several alternate embodiments, it will be understood by persons skilled in the relevant art that various changes in form and details can be made therein without departing from the spirit and scope of the invention.

What is claimed is:

1. A computer-implemented method of a document management system for sharing a document during an online sharing session, the computer-implemented method comprising:
    receiving, by the document management system, a request from a first device of a first user to generate a document, the request including a document type of the document;
    transmitting, by the document management system, a document template associated with the document type to the first device, content of the document template including a plurality of different groups of information fields, each group of information fields including a plurality of information fields that correspond to the group;
    determining, by the document management system, a plurality of values for the plurality of information fields included in each group to complete the document template, wherein at least one value is automatically retrieved by the document management system from another document stored at the document management system;
    storing, by the document management system, the completed document template as a document including content, the content comprising the plurality of different groups of information fields, each group of information fields including the plurality of information fields that correspond to the group and the plurality of values for the plurality of information fields in the group;
    receiving a request from the first device of the first user to share the document with a second user, the request including filtering criteria for the content included in the document that specifies at least a first group of information fields from the plurality of different groups of information fields and a first plurality of data values that correspond to the first group of information fields to include in the shared document, and a second group of information fields from the plurality of different groups of information fields and a second plurality of data values that correspond to the second group of information fields to exclude from the shared document;
    establishing, by the document management system, an online sharing session between the first device of the first user and a second device of the second user, the online sharing session including the shared document that is viewable by the first user via the first device and viewable by the second user via the second device at a same time within the online sharing session, the shared document including the first group of information fields and the first plurality of values for the first group of information fields but not the second group of information fields and the second plurality of values for the second group of information fields;
    receiving, by the document management system, an annotation to the content included in the shared document from at least one of the first device or the second device within the online sharing session; and
    updating the shared document included in the online sharing session to include the received annotation, wherein a location of the received annotation in the shared document displayed on the first device having a first device type within the online sharing session matches a location of the received annotation in the shared document displayed in the second device within the online sharing session, the second device having a second device type that is different from the first device type.

2. The computer-implemented method of claim 1, wherein receiving the request from the first device of the first user to share the document with the second user comprises:
    generating a preview of the document based on the filtering criteria; and
    transmitting the preview of the document to the first device of the user.

3. The computer-implemented method of claim 2, wherein the document stored by the document management system has a first file format and the preview of the document has a second file format that is different from the first file format.

4. The computer-implemented method of claim 3, wherein receiving the request from the first device of the first user to share the document with the second user comprises:
    generating the shared document based on the preview of the document responsive to the request, the shared document in a third file format that is different from the first file format of the stored document and the second file format of the preview of the document.

5. The computer-implemented method of claim 1, wherein the online sharing session includes a plurality of annotation tools where each annotation tool is associated with a different type of annotation to add to the shared document during the online sharing session.

6. The computer-implemented method of claim 1, wherein receiving the annotation comprises:
    receiving attributes of the annotation, the attributes of the annotation including an annotation type associated with the annotation and a plurality of coordinates that define a location of the annotation in the shared document.

7. The computer-implemented method of claim 6, wherein updating the shared document comprises:
    transmitting the attributes of the annotation to the first device and the second device, wherein the first device and the second device each render the annotation on the shared document according to the attributes of the annotation.

8. A non-transitory computer-readable storage medium storing executable computer program instructions for sharing a document during an online sharing session, the instructions when executed by one or more computer processors cause the one or more computer processors to perform steps comprising:
    receiving, by a document management system, a request from a first device of a first user to generate a document, the request including a document type of the document;
    transmitting, by the document management system, a document template associated with the document type to the first device, content of the document template including a plurality of different groups of information fields, each group of information fields including a plurality of information fields that correspond to the group;

determining, by the document management system, a plurality of values for the plurality of information fields included in each group to complete the document template, wherein at least one value is automatically retrieved by the document management system from another document stored at the document management system;

storing, by the document management system, the completed document template as a document including content, the content comprising the plurality of different groups of information fields, each group of information fields including the plurality of information fields that correspond to the group and the plurality of values for the plurality of information fields in the group;

receiving a request from the first device of the first user to share the document with a second user, the request including filtering criteria for the content included in the document that specifies at least a first group of information fields from the plurality of different groups of information fields and a first plurality of data values that correspond to the first group of information fields to include in the shared document, and a second group of information fields from the plurality of different groups of information fields and a second plurality of data values that correspond to the second group of information fields to exclude from the shared document;

establishing, by the document management system, an online sharing session between the first device of the first user and a second device of the second user, the online sharing session including the shared document that is viewable by the first user via the first device and viewable by the second user via the second device at a same time within the online sharing session, the shared document including the first group of information fields and the first plurality of values for the first group of information fields but not the second group of information fields and the second plurality of values for the second group of information fields;

receiving, by the document management system, an annotation to the content included in the shared document from at least one of the first device or the second device within the online sharing session; and updating the shared document included in the online sharing session to include the received annotation, wherein a location of the received annotation in the shared document displayed on the first device having a first device type within the online sharing session matches a location of the received annotation in the shared document displayed in the second device within the online sharing session, the second device having a second device type that is different from the first device type.

9. The non-transitory computer-readable storage medium of claim 8, wherein receiving the request from the first device of the first user to share the document with the second user comprises:

generating a preview of the document based on the filtering criteria; and transmitting the preview of the document to the first device of the user.

10. The non-transitory computer-readable storage medium of claim 9, wherein the document stored by the document management system has a first file format and the preview of the document has a second file format that is different from the first file format.

11. The non-transitory computer-readable storage medium of claim 10, wherein receiving the request from the first device of the first user to share the document with the second user comprises:

generating the shared document based on the preview of the document responsive to the request, the shared document in a third file format that is different from the first file format of the stored document and the second file format of the preview of the document.

12. The non-transitory computer-readable storage medium of claim 8, wherein the online sharing session includes a plurality of annotation tools where each annotation tool is associated with a different type of annotation to add to the shared document during the online sharing session.

13. The non-transitory computer-readable storage medium of claim 8, wherein receiving the annotation comprises:

receiving attributes of the annotation, the attributes of the annotation including an annotation type associated with the annotation and a plurality of coordinates that define a location of the annotation in the shared document.

14. The non-transitory computer-readable storage medium of claim 13, wherein updating the shared document comprises:

transmitting the attributes of the annotation to the first device and the second device, wherein the first device and the second device each render the annotation on the shared document according to the attributes of the annotation.

15. A document management system for sharing a document during an online sharing session, comprising:

one or more computer processors; and a non-transitory computer-readable storage medium storing executable computer program instructions, the instructions when executed by the one or more computer processors cause the one or more computer processors to perform steps comprising:

receiving, by the document management system, a request from a first device of a first user to generate a document, the request including a document type of the document;

transmitting, by the document management system, a document template associated with the document type to the first device, content of the document template including a plurality of different groups of information fields, each group of information fields including a plurality of information fields that correspond to the group;

determining, by the document management system, a plurality of values for the plurality of information fields included in each group to complete the document template, wherein at least one value is automatically retrieved by the document management system from another document stored at the document management system;

storing, by the document management system, the completed document template as a document including content, the content comprising the plurality of different groups of information fields, each group of information fields including the plurality of information fields that correspond to the group and the plurality of values for the plurality of information fields in the group;

receiving a request from the first device of the first user to share the document with a second user, the request including filtering criteria for the content included in the document that specifies at least a first group of information fields from the plurality of different groups of information fields and a first plurality of data values that correspond to the first group of information fields to include in the shared document, and a second group of information fields from the plurality of different groups of information fields and a second plurality of data values that correspond to the second group of information fields to exclude from the shared document;

establishing, by the document management system, an online sharing session between the first device of the first user and a second device of the second user, the online sharing session including the shared document that is viewable by the first user via the first device and viewable by the second user via the second device at a same time within the online sharing session, the shared document including the first group of information fields and the first plurality of values for the first group of information fields but not the second group of information fields and the second plurality of values for the second group of information fields;

receiving, by the document management system, an annotation to the content included in the shared document from at least one of the first device or the second device within the online sharing session; and updating the shared document included in the online sharing session to include the received annotation, wherein a location of the received annotation in the shared document displayed on the first device having a first device type within the online sharing session matches a location of the received annotation in the shared document displayed in the second device within the online sharing session, the second device having a second device type that is different from the first device type.

16. The document management system of claim 15, wherein receiving the request from the first device of the first user to share the document with the second user comprises:
generating a preview of the document based on the filtering criteria; and
transmitting the preview of the document to the first device of the user.

17. The document management system of claim 15, wherein receiving the annotation comprises:
receiving attributes of the annotation, the attributes of the annotation including an annotation type associated with the annotation and a plurality of coordinates that define a location of the annotation in the shared document.

* * * * *